(12) United States Patent  
Ouyang

(10) Patent No.: US 8,279,622 B2  
(45) Date of Patent: Oct. 2, 2012

(54) ELECTRONIC DEVICE

(75) Inventor: Zhi-Bin Ouyang, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 292 days.

(21) Appl. No.: 12/758,137

(22) Filed: Apr. 12, 2010

(65) Prior Publication Data  
US 2011/0222259 A1   Sep. 15, 2011

(30) Foreign Application Priority Data  
Mar. 15, 2010  (CN) .......................... 2010 1 0124290

(51) Int. Cl.  
*H05K 7/02* (2006.01)  
*H05K 7/04* (2006.01)  
(52) U.S. Cl. ...................... 361/807; 455/575.4  
(58) Field of Classification Search ............... 455/575.1, 455/575.3, 575.4; 361/756, 727, 741; 235/483; 439/377, 374  
See application file for complete search history.

(56) References Cited

U.S. PATENT DOCUMENTS

| 7,076,058 | B2 * | 7/2006 | Ikeuchi et al. | 379/433.12 |
| 7,558,069 | B2 * | 7/2009 | Chung | 361/737 |
| 2005/0221873 | A1 * | 10/2005 | Kameyama et al. | 455/575.4 |
| 2008/0139261 | A1 * | 6/2008 | Cho et al. | 455/575.4 |
| 2008/0225495 | A1 * | 9/2008 | Lee et al. | 361/727 |
| 2009/0111540 | A1 * | 4/2009 | Inoue et al. | 455/575.3 |
| 2009/0215507 | A1 * | 8/2009 | Park | 455/575.4 |
| 2010/0227655 | A1 * | 9/2010 | Takabayashi | 455/575.3 |

* cited by examiner

*Primary Examiner* — Lisa Lea Edmonds  
*Assistant Examiner* — Xanthia C Cunningham  
(74) *Attorney, Agent, or Firm* — Altis Law Group, Inc.

(57) ABSTRACT

An electronic device includes a body section, a cove section and a slider section. The cover section is pivotably coupled with the body section by a joint such that the cover section is foldable up or upon the body section. The slider section has a key board hidden between the body section and the cover section when the cover section is folded upon the body section. The slider section is slidably mounted to the body section such that the key board is capable of being exposed.

15 Claims, 6 Drawing Sheets

ELECTRONIC DEVICE

BACKGROUND

1. Technical Field

The disclosure relates to electronic devices, especially to slidable electronic devices that have a rotating hinge portion.

2. Description of Related Art

Handheld device are continually being reduced in size and improved to meet consumer size, aesthetic, and performance requirements. Slidable electronic device permit parts of such devices, such as displays or keypads, to be retracted and hidden when not in use. Slider mechanisms can facilitate miniaturization and offer additional freedom to device designers.

However, known slidable electronic device can not meet rotate between parts of such device, for example, between an upper element and a lower element.

Therefore, there is room for improvement within the art.

BRIEF DESCRIPTION OF THE DRAWINGS

Many aspects of the electronic device can be better understood with reference to the following drawings. The components in the drawings are not necessarily to scale, the emphasis instead being placed upon clearly illustrating the principles of the present hinge assembly. Moreover, in the drawings, like reference numerals designate corresponding parts throughout the several views, in which.

DETAILED DESCRIPTION OF THE EMBODIMENTS

For illustrative purposes, the device is an electronic device such as a radiotelephone. The radiotelephone described herein is a representation of the type of wireless communication device that may benefit from the present disclosure. However, it is to be understood that the present disclosure may be applied to any type of hand-held or portable device including, but not limited to, the following devices: cordless phones, paging devices, personal digital assistants, portable computers, pen-based or keyboard-based handheld devices, remote control units, portable media players that have wireless communication capability and the like. Accordingly, any reference herein to the radiotelephone should also be considered to apply equally to other portable wireless electronic devices.

Figure 1:
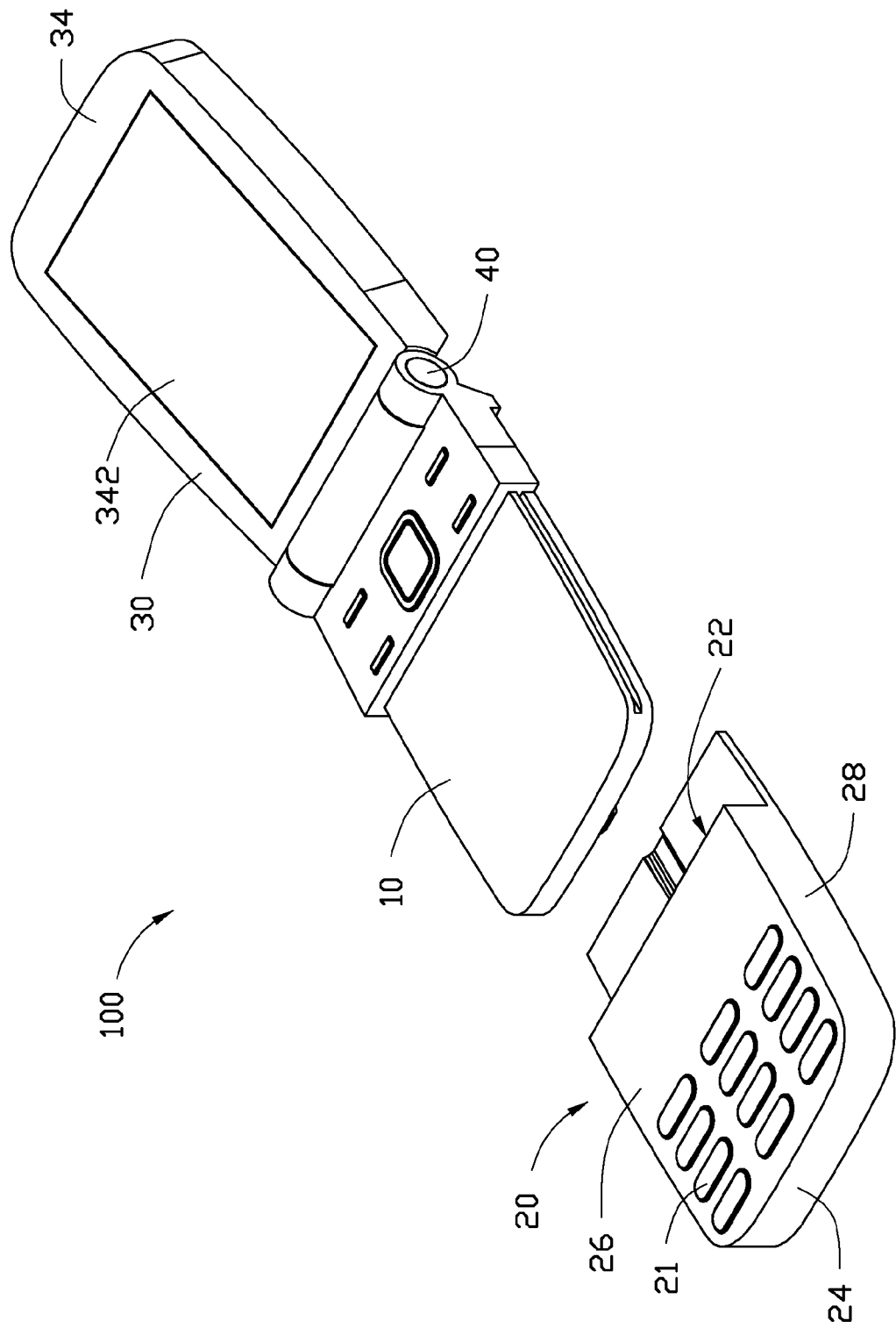
FIG. 1 is a schematic view of one embodiment of an electronic device including a cover section, a body section, a slider section, a slide enabling member and a joint in an open configuration with the slider section exploded from the body section.
Figure 2:
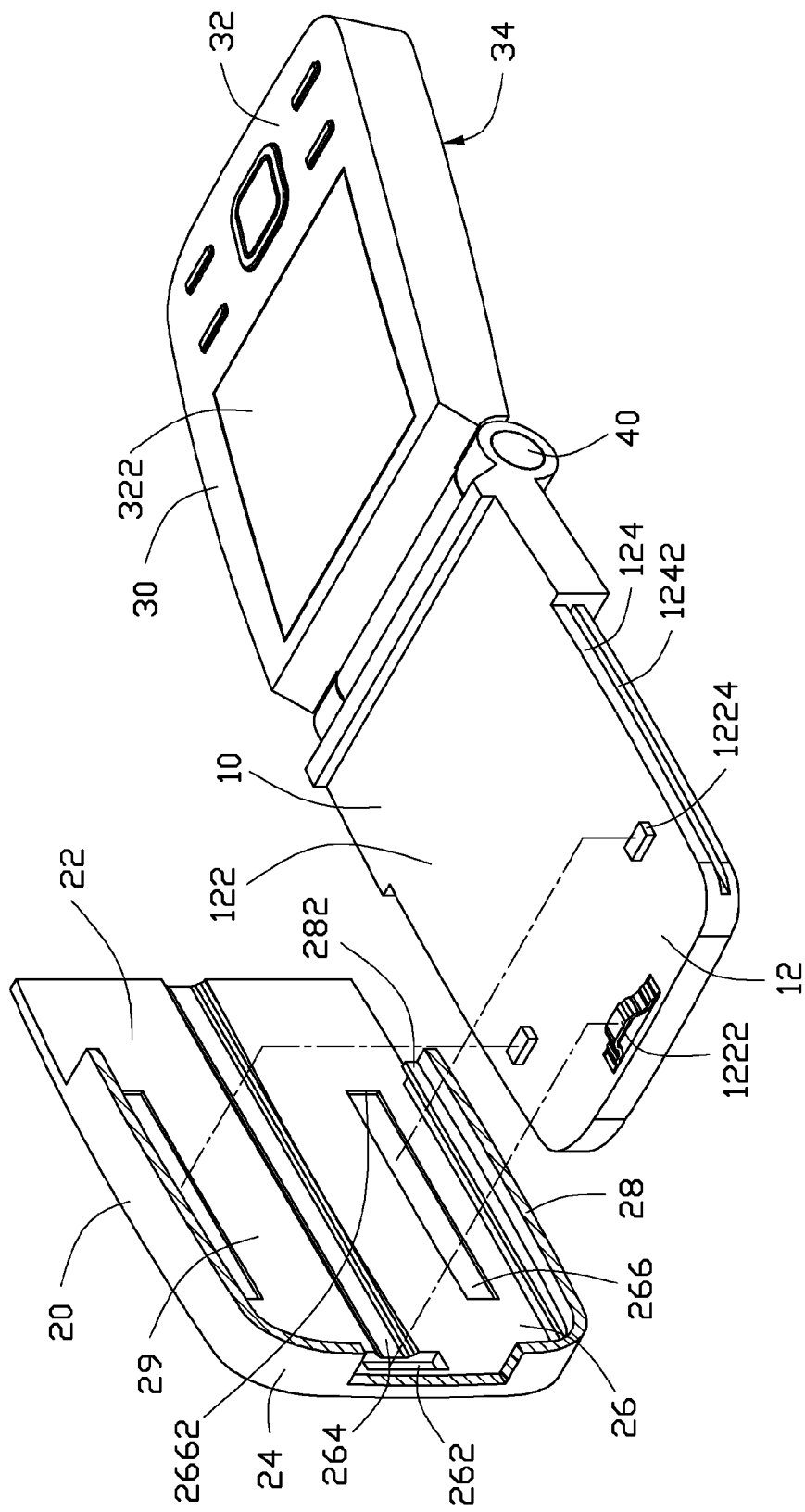
FIG. 2 is similar to FIG. 1, but showing the electronic device from another aspect and with the slider section being partially cut away.

One embodiment of an electronic device 100 incorporating a slide and tilt mechanism is shown in FIG. 1 and FIG. 2. The device 100, a radiotelephone for illustration, includes a body section 10, a slider section 20 and a cover section 30. In a closed configuration shown in FIG. 4, the cover section 30 can overlap both the slider section 20 and the body section 30. In an open configuration shown in FIG. 3, a portion of the cover section 30 is folded away from the body section 10 exposing a keyboard 21 of the slider section 20. In an open configuration shown in FIG. 6, the slider section 20 extends from the body section 10 exposing the key board 21 of the slider section 20.

Figure 3:
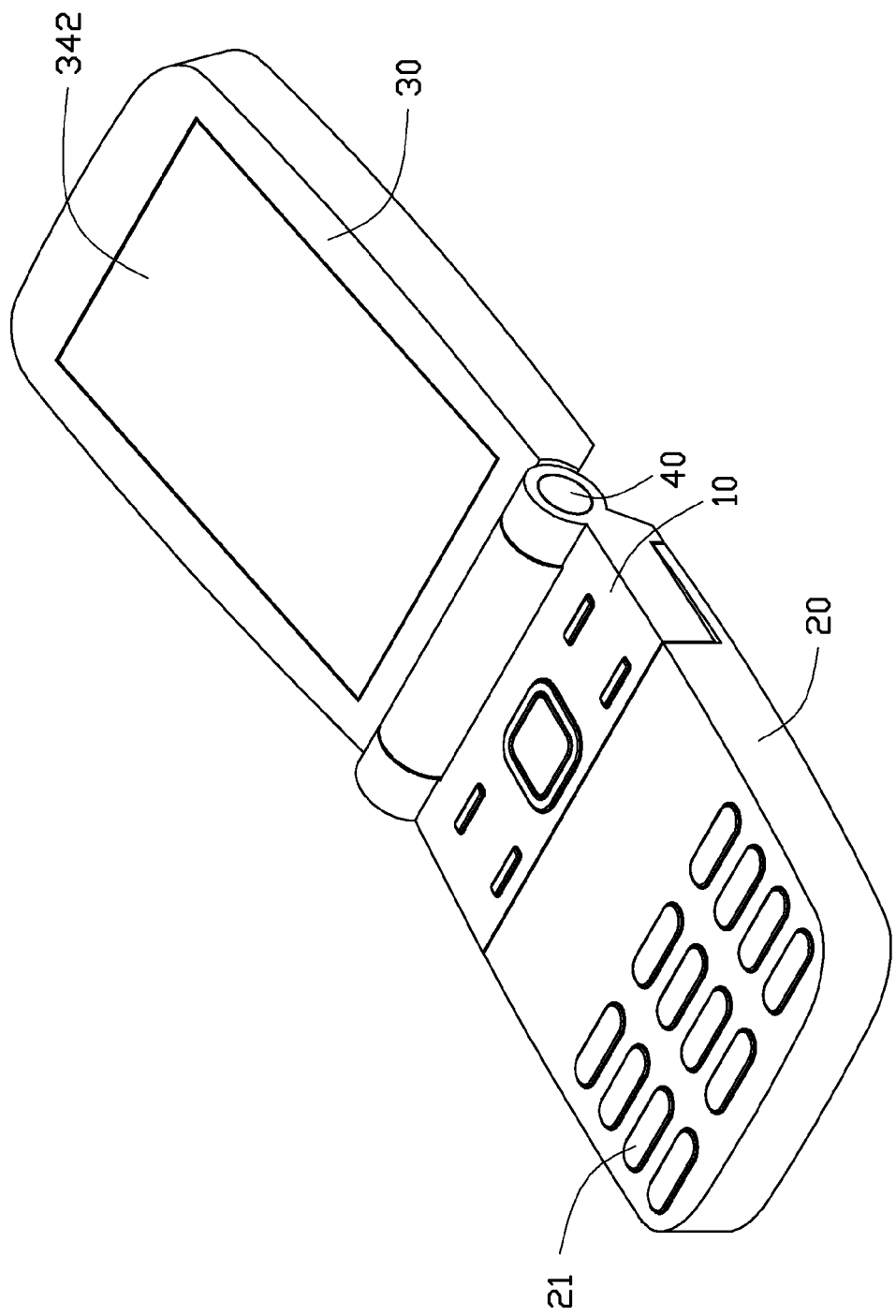
FIG. 3 is a schematic view of the electronic device shown in FIG. 1, but with the slider section assembled to the body section.

Referring to FIGS. 1 to 3, the body section 10 includes an end portion hinged with the cover section 30, and a mating portion 12 formed on another end portion thereof. The mating portion 12 includes a mating portion bottom surface 122 facing away from the cover section 30 and two opposite mating portion side surface 124 connecting with the mating portion bottom surface 122.

The mating portion 12 has a latching member 1222 and two stopping blocks 1224 mounted on the mating portion bottom surface 122. The latching member 1222 is configured to engage with the slider section 20 to hold the slider section 20 to the body section 10 when the device 100 is in the closed configuration shown in FIG. 4. The stopping blocks 1224 are configured to engage with the slider section 20 to hold the slider section 20 to the body section 10 when the device 100 is in the open configuration shown in FIG. 6. In this embodiment, the latching member 1222 is an arcuate elastic plate having two opposite ends connected to the mating portion bottom surface 122 and a middle portion hung over the mating portion bottom surface 122. The latching member 1222 is located at or near a distal end of the mating portion 12. The stopping blocks 1224 are located at two sides of the latching member 1222. In this embodiment, two stopping blocks 1224 are shown. However it is understood that a plurality of stopping blocks 1224 or only a single stopping block 1224 may be used.

Each mating portion side surface 124 has a track 1242 defined longitudinally therein. The tracks 1242 are configured to guide the slider section 20 to slide relative to the body section 10.

The slider section 20 has a compartment 29 that can be complementary in shape to the mating portion 12 of the body section 10. The compartment 29 is defined by an opening end portion 22, a closed end portion 24, two opposite slider section bottom walls 26 and two opposite slider section side walls 28. The mating portion 12 is slidably accommodated in the compartment 29. When the slider section 20 slides relative to the mating portion 12, the two slider section side walls 28 are respectively in contact with the two mating portion side surfaces 124, and a slider section bottom wall 28 facing the mating portion bottom surface 122 is in contact with the mating portion bottom surface 122. The slider section bottom wall 28 facing the mating portion bottom surface 122 has a latching receptacle 262 latched with the latching member 1222, a slot 264 defined longitudinally therein and communicating with the latching receptacle 262 and two grooves 266 defined longitudinally therein corresponding to the stopping blocks 1224 of the slider section 20. The slider section 20 also has two stopping surface 2662 respectively formed in the grooves 266 facing away from the closed end portion 24 of the slider section 20. When the slider section 20 is slid to the closed configuration shown in FIG. 4, the latching receptacle 262 engages the latching member 1222. As the slider section 20 slides, the latching member 1222 slides in the slot 264 of the slider section 20. The stopping surfaces 2662 engage the stopping blocks 1224 to provide a retaining member 50 for holding the slider section 20 to the body section 10 when the device 100 is in the open configuration shown in FIG. 6.

Each slider section side wall 28 has a rail 282 protruding longitudinally therefrom. The rails 282 are slidably accommodated in the tracks 1242 of the body section 10 to form a slide enabling member (not labeled) that provides a mechanism for the slider section 20 to slidably engage the body section 10. In other words, the slider section 20 slides along the rails 282 between the closed configuration shown in FIG. 4 and the open configuration shown in FIG. 6. It is understood that one of ordinary skill in the art will appreciate that the slide enabling member that comprises the rail 282 and the track 1242 are one example. It is also understood that the rails 282 may be positioned on either the slider section 20 or the body section 10 and the rail 282 engaging members (e.g. tracks 1242) may be positioned on the element opposite the rails 282.

The cover section 30 includes a cover section top surface 32 and a cover section bottom surface 34. The cover section top surface 32 has a first display 322 mounted thereon, and the cover section bottom surface 34 has a second display 342 mounted thereon. The cover section 30 is pivotably coupled to the body section 10 by a joint 40 positioned at or near the cover section bottom surface 34. The joint 40 may be a hinge, such as a barrel and pin hinge, a resilient member such as rubber or plastic, or the like. The joint 40 is a rotating mechanism such that the cover section 30 can fold up or upon the body section 10.

Figure 4:
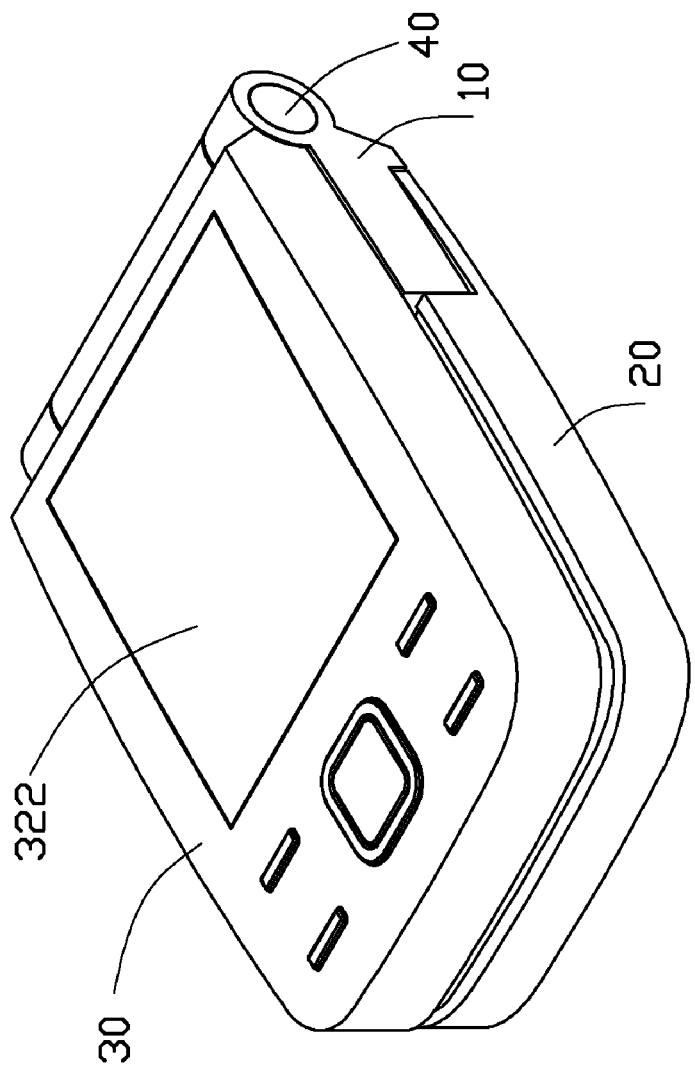
FIG. 4 is a schematic view of the electronic device shown in FIG. 3 in a closed configuration.
Figure 5:
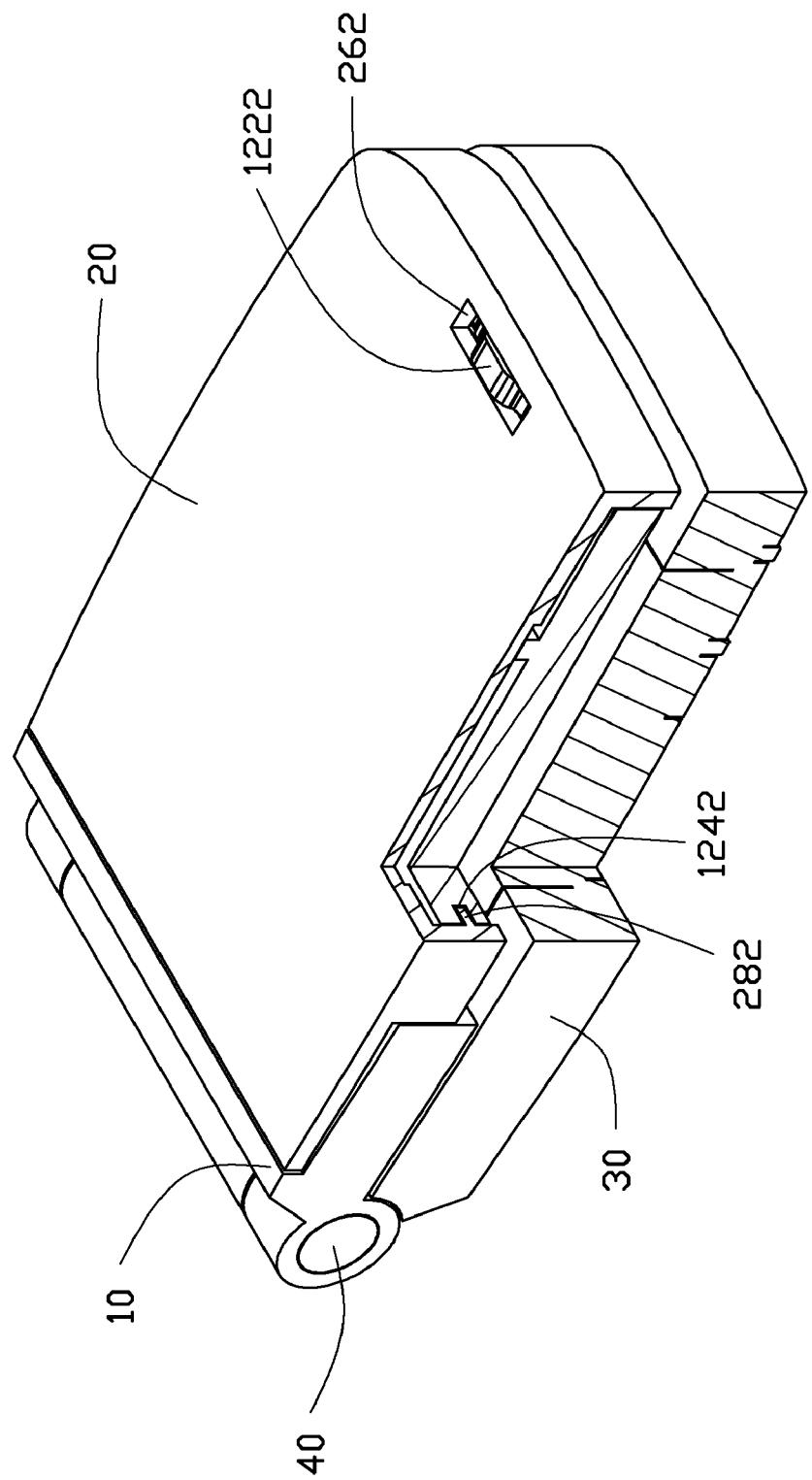
FIG. 5 is a cut away view of the electronic device shown in FIG. 4.

Referring to FIGS. 4 and 5, in assembly, the opening end portion 22 of the slider section 20 is first aligned with the mating portion 12 of the body section 10, and the slider section bottom wall 28 of the slider section 20 having the latching receptacle 262 faces the mating portion bottom surface 122. The slider section 20 is then pushed toward the mating portion 12, until the latching member 1222 latches with the latching receptacle 262 and the mating portion 12 is accommodated in the compartment 29 of the slider section 20. During this motion, the latching member 1222, the stopping blocks 1224 and the rails 282 are slid in the slot 264, the grooves 266 and the tracks 1242, respectively. Finally, the cover section 30 is hinged with the body section 10 by the joint 40, yielding an assembled device 100.

Figure 6:
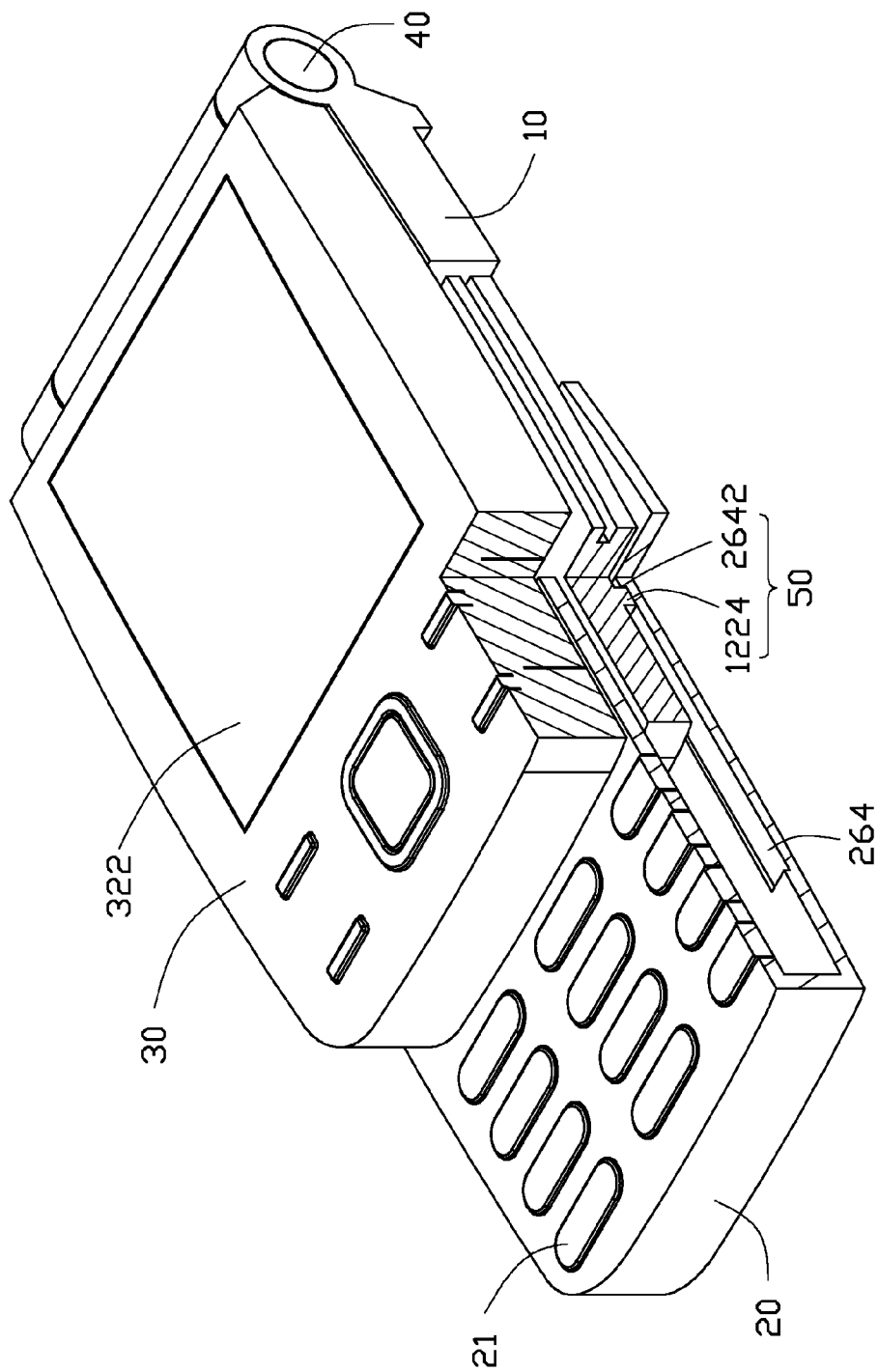
FIG. 6 is a cut away view of the electronic device shown in FIG. 4, but with the slider section slid relative to the body section.

Referring to FIGS. 5 and 6, when sliding the slider section 20 relative to the body section 10, the latching member 1222 is pushed and released from the latching receptacle 262. The slider section 20 is then moved longitudinally along the rails 282. During this motion, the latching member 1222, the stopping blocks 1224 and the rails 282 are slid in the slot 264, the grooves 266 and the tracks 1242, respectively, until the stopping blocks 1224 resist against the stopping surface 2622. At this time, the key board 21 of the slider section 20 is exposed out of a distal end of the cover section 30 for use. Additionally, a user can rotate the cover section 30 with respect to the body section 10, thus exposing the key board 21 out of the cover section 30 as shown in FIG. 3.

A method for opening the slide and tilt housing comprises providing a sliding mechanism to allow a slider section to slide relative to a body section, wherein the body section is partially accommodated in the slider section, and a rotating mechanism to allow a cover section to rotate relative to the body section, wherein the cover section is hingedly coupled with the body section by a hinge. The slider section includes a key board located between the body section and the cover section when the cover section is in a closed configuration relative to the body section. The key board is exposed when the slider section is in an open configuration relative to the body section or when the cover section is in another open configuration relative to the body section.

It is to be understood, however, that even through numerous characteristics and advantages of the present disclosure have been set forth in the foregoing description, together with details of the structure and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. An electronic device comprising:
a body section;
a cover section pivotably coupled with the body section by a joint such that the cover section is foldable upon the body section; and
a slider section having a key board, wherein the key board is hidden between the body section and the cover section when the cover section is folded upon the body section, and the slider section is slidably mounted to the body section such that the key board is capable of being exposed for use even when the cover section is folded upon the body section.

2. The electronic device as claimed in claim 1, wherein the body section comprises an end portion hinged with the cover section and a mating portion opposite to the end portion; the slider section is slidably mounted to the mating portion.

3. The electronic device as claimed in claim 2, wherein the slider section comprises a compartment defined therein; the mating portion is slidably accommodated in the compartment.

4. The electronic device as claimed in claim 3, wherein the compartment is defined by an opening end portion, a closed end portion, two opposite slider section bottom walls and two opposite slider section side walls.

5. The electronic device as claimed in claim 4, wherein each slider section side wall comprises a rail protruding longitudinally therefrom; the mating portion comprises two opposite mating portion side surfaces; the two slider section side walls are respectively in contact with the two mating portion side surfaces; each mating portion side surface comprises a track defined longitudinally therein; the rails are slidably accommodated in the tracks.

6. The electronic device as claimed in claim 5, wherein a first of the slider section bottom walls is positioned between the cover section and the body section, on which the key board is mounted.

7. The electronic device as claimed in claim 6, wherein the mating portion further comprises a mating portion bottom surface facing a second of the slider section bottom walls opposite to the key board; the mating portion bottom surface comprises a latching member protruding therefrom; the second of the slider section bottom walls comprises a latching receptacle releasably latched with the latching member.

8. The electronic device as claimed in claim 7, wherein the second of the slider section bottom walls of the slider section further comprises a slot defined longitudinally therein communicating with the latching receptacle; as the slider section slides, the latching member slides in the slot of the slider section.

9. The electronic device as claimed in claim 7, wherein the mating portion bottom surface comprises a stopping block protruding therefrom; the second of the slider section bottom walls of the slider section comprises a stopping surface corresponding to the stopping block; the stopping surface engages the stopping block to hold the slider section to the body section.

10. The electronic device as claimed in claim 9, wherein the slider section further comprises a groove defined therein corresponding to the stopping blocks; the stopping surface is formed in the grooves facing away from the closed end portion; the stopping block is slidably accommodated in the groove.

11. An electronic device comprising:

a first housing section;

a second housing section pivotably coupled to the first housing section by a hinge;

a third housing section slidably engaged to the first housing section by a slide enabling mechanism;

a key board mounted to the third housing section and shielded between the first housing section and the second housing section when the second housing section is superposed on the first housing section;

wherein the key board is exposed for use in a first open configuration when the third housing section is slid relative to the first housing and the second housing to be in an extended configuration; and, wherein the second housing section is held in a second open configuration to expose the key board for use when the second housing rotate about the hinge relative to the first housing section.

12. The electronic device as claimed in claim 11, wherein the slide enabling mechanism comprises a track and a rail slidably engaging with the track, the rail is positioned on one of the first housing section and the third housing section, the track is positioned on the other one of the first housing section and the third housing section.

13. The electronic device as claimed in claim 11, wherein the first housing section comprises a latching member and the third housing section comprises a latching receptacle engaging the latching member when the third housing section is in a closed configuration.

14. The electronic device as claimed in claim 11, wherein the electronic device further comprises a retaining member holding the third housing section to the first housing section when the third housing section is in the first open configuration.

15. The electronic device as claimed in claim 14, wherein the retaining member comprises a stopping block formed on the first housing section and a stopping surface formed on the third housing section.

\* \* \* \* \*